Jan. 30, 1951   S. NOODLEMAN   2,539,856
CONTROL SYSTEM FOR DUAL VOLTAGE INDUCTION MOTORS
Filed Nov. 25, 1947

INVENTOR.
Samuel Noodleman,
BY Dybrig & Dybrig
His Attorneys.

Patented Jan. 30, 1951

2,539,856

UNITED STATES PATENT OFFICE 2,539,856

CONTROL SYSTEM FOR DUAL VOLTAGE INDUCTION MOTORS

Samuel Noodleman, Dayton, Ohio, assignor to Standard Dayton Corporation, Dayton, Ohio, a corporation of Ohio Application November 25, 1947, Serial No. 788,045

10 Claims. (Cl. 318—221)

This invention relates to an improved motor and motor control system and more particularly to an improved arrangement which makes it possible to operate a motor at more than one voltage.

This invention is related to the invention disclosed in my co-pending application Serial Number 624,174 filed October 24, 1945, now Patent No. 2,442,207.

Various types of switching arrangements have been devised for controlling the flow of current to the starting or phase windings of a motor but not all of these can be used on a motor designed for operating on either of two voltages such as 115 volts and 230 volts because many switching devices which cause proper switching at the one voltage, will not cause proper switching at the other voltage, or if they switch properly at either voltage, they are otherwise unsuitable for proper and efficient operation of the motor. Thus, one type of switching device for example, works satisfactorily at normal rated voltages, but renders the motor incapable of starting at abnormally low voltages such as often encountered in actual service. Mechanically operated speed responsive switches have desirable switching characteristics and are capable of operating at any voltage but are otherwise objectionable. It is an object of this invention to provide a switch having the desirable characteristics of a speed responsive switch coupled with the desirable features of an electrically operated switch.

More specifically, it is an object of this invention to provide an improved electrically operated switching arrangement for cutting out the phase winding in a multiple voltage motor.

Another object of this invention is to provide a switching means for a motor capable of starting at voltages considerably lower than the rated voltage of the motor.

Still another object of this invention is to provide a motor and motor control system wherein the phase winding of the motor is cut in and cut out at or near the desired motor speed irrespective of the voltage supplied to the motor.

Other objects and advantages reside in the construction of parts, the combination thereof and the mode of operation, as will become more apparent from the following description.

Figure 1:
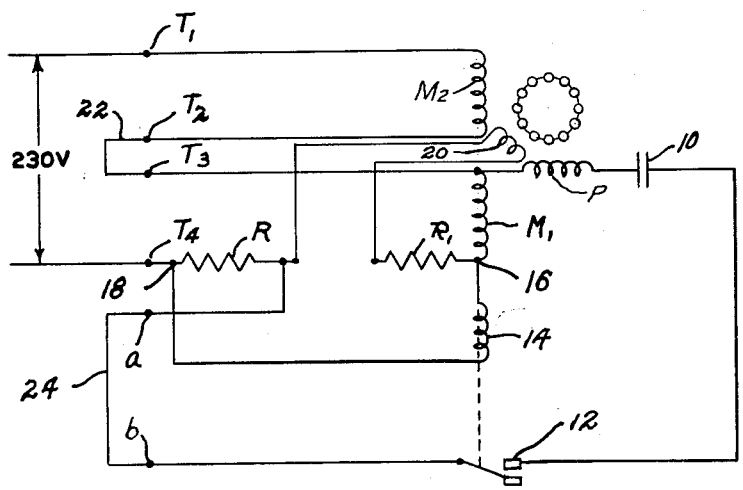
Figure 1 is a schematic wiring diagram disclosing the field windings and circuit connections used when operating the multiple voltage motor on a high voltage such as 230 volts.
Figure 2:
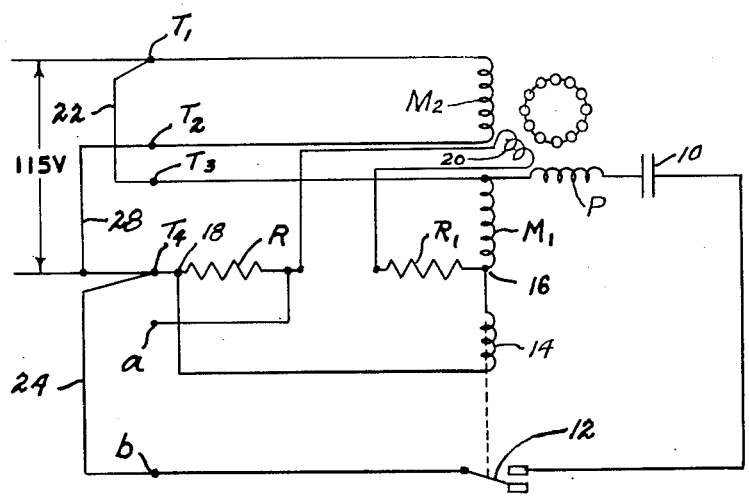
Figure 2 shows the motor field windings and the circuit connections used when operating the same motor on a low voltage such as 115 volts.

Referring now to the drawings wherein I have shown a preferred embodiment of my invention, the four main motor terminals have been designated as $T_1$, $T_2$, $T_3$ and $T_4$ and the main field windings have been designated as $M_1$ and $M_2$ whereas the starter winding or phase winding, as it is sometimes called, is designated as P. For purposes of illustration, a condenser 10 has been shown connected in series with the phase winding P for providing a phase displacement or a leading current through the starter winding. Instead of a condenser, a resistance or other suitable impedance may be used for producing the desired phase displacement.

The circuit through the phase winding P is adapted to be opened when the motor attains a predetermined speed by means of a switch 12 which is arranged in the phase winding circuit as shown. The switch 12 is operated by means of a solenoid or relay coil 14 which has its one side connected to the terminal 16 and its other side connected to the terminal 18 which is arranged as shown. A pair of resistance elements R and $R_1$ together with a pick-up coil 20 have been connected between the terminals 16 and 18 for a purpose to be explained more fully hereinafter. The coil 20 is laid in the stator and is adapted to link the flux created by the main and phase windings so that the vector voltage generated in the coil 20 is determined by the speed of the motor as well as the flux produced by the main and phase windings. Changes in the voltage across the pick-up coil 20 and the resistance elements R and $R_1$, cause changes in the flow of current through the relay coil 14 and thus it is possible to make use of the coil 14 for operating the switch 12. For a more detailed explanation of the principal of operation of the pick-up coil 20, the resistor R, and the relay coil 14, reference is hereby made to said copending application.

When the motor is adapted to be operated as a 230 volt motor, the field windings $M_2$ and $M_1$ are connected in series by means of a bridge element or conductor 22 which connects terminals $T_2$ and $T_3$ as shown, and terminals $a$ and $b$ are connected together by means of a bridge element or conductor 24 with the result that the resistance R is connected in series with the phase winding P.

When the same motor is adapted to be used on a 115 volt power supply, the field winding $M_2$ is connected directly across the main 115 volt power supply and in parallel with the main field winding $M_1$. When using 115 volts, the one upper end of the conductor 22 is disconnected from $T_2$ and shifted to $T_1$, so that the terminals $T_1$ and $T_3$ are connected by means of the bridge element 22 and the terminals $T_2$ and $T_4$ are connected by means of the conductor or bridge element 28. The one end of conductor 24 is disconnected from $a$ and shifted to $T_4$ so that terminal $a$ is then left unconnected, but the terminal $b$ is connected to $T_4$ by the bridge element 24. The terminals $T_1$, $T_2$, $T_3$, $T_4$, $a$, and $b$ are preferably accessible from outside of the motor housing so that the bridging elements 22, 24, and 28 may be changed at will. For purposes of illustration, these bridging elements have been shown as simple wires which are adapted to be manually connected and disconnected at will, whereas in actual practice one could use special switching means for reconnecting the terminals when changing from one voltage to another.

For proper operation of the switch 12, it is desirable to have the relay 14 connected in the circuit in such a manner that the relay will operate at the same speed irrespective of whether the motor is operating on 115 or 230 volts. Proper switching action is obtained in the circuit shown by having the proper balance between R and $R_1$.

Furthermore, in the circuit arrangement shown, the main current flowing through R and $R_1$ is sufficient to cause the necessary voltage drop to operate the relay coil 14 under the lowest or worse line voltage conditions encountered. It will be noted that when using the motor on 115 volts, no phase current flows through the resistances R and $R_1$, but when using the motor on 230 volts, then the phase current flows through the resistance R, but not through the resistance $R_1$. By virtue of this simple expedient, the relay 14 operates at substantially the same motor speed irrespective of the applied voltage.

The terminals $T_1$ and $T_4$ constitute the main power terminals and the bridge elements 22 and 28 constitute means for selectively connecting the main field windings in series or parallel across the power terminals.

The resistance element R and $R_1$ may consist of resistance wires connected in series as shown, or it is possible to incorporate the resistance $R_1$ in the pick-up coil 20.

For convenience of description, reference has been made to operating the motor at either 115 volts or 230 volts, whereas, these voltage values have been given merely for purposes of explanation and are not used in a limiting sense.

Although the preferred embodiment of the device has been described, it will be understood that within the purview of this invention various changes may be made in the form, details, proportions, and arrangement of parts, the combination thereof and mode of operation, which generally stated consist in a device capable of carrying out the objects set forth, as disclosed and defined in the appended claims.

Having thus described my invention, I claim:

1. In an induction motor, a first primary winding, a second primary winding, a phase winding, a pick-up coil located in inductive relation with at least a portion of said primary windings, means for connecting said first and second primary windings in series, first and second resistance means, means for connecting said resistance means in series with said pick-up coil and said primary windings, means including a switch for connecting said phase winding in parallel circuit relationship with said first named primary winding, said pick-up coil, and one of said resistance means, and a solenoid for operating said switch in response to the voltage drop across said pick-up coil and both said resistance means.

2. In an inductive motor and motor control circuit; a first primary winding; a second primary winding; a pick-up coil located in inductive relation to said first and second primary windings; a first resistance element; a second resistance element; means for connecting said first resistance element, second resistance element, and pick-up coil in series with said first primary winding; means for connecting said second primary winding in parallel circuit relationship with said first primary winding, said first resistance element, said second resistance element, and said pick-up coil; a phase winding; switch means controlling the energization of said phase winding; and a solenoid connected across said first and second resistance elements and said pick-up coil for operating said switch.

3. In combination, a first primary winding; a second primary winding; a source of electrical energy; means for connecting said second primary windings directly to said source of energy; a phase winding; means including a switch for connecting said phase winding directly to said source of power; resistance means; a pick-up coil located in inductive relation with said first and second primary winding; and means for connecting said pick-up coil, said resistance means and said first named primary winding in series circuit relationship to said source of energy, and a solenoid operative in response to the voltage drop across said pick-up coil and said resistance means for controlling the operation of said switch.

4. In an induction motor adapted to operate at multiple voltages, a stator comprising first and second primary winding means for establishing a field of flux, means for selectively connecting said first and second primary winding means either in series or parallel, a pick-up coil arranged to link a portion of said flux, resistance means, means for connecting said resistance means and said pick-up coil in series circuit relationship with one of said primary winding means, said stator also including a phase winding, means for energizing said phase winding, and means responsive to the voltage drop across said pick-up coil and said resistance means for controlling the energization of said phase winding.

5. In an induction motor adapted to operate at multiple voltages, a stator comprising first and second primary winding means for establishing a field of flux, a pick-up coil arranged to link a portion of said flux, resistance means, means for connecting said resistance means and said pick-up coil in series circuit relationship with one of said primary winding means, said stator also including a phase winding, means for energizing said phase winding, and means responsive to the voltage drop across said pick-up coil and said resistance means for controlling the energization of said phase winding, and means for selectively connecting said first and second primary winding means in either series or parallel current flow relationship.

6. In an alternating current motor adapted to operate at multiple voltages, a stator comprising first and second primary winding means for establishing a field of flux, a pick-up coil arranged to link a portion of said flux, resistance means, means for connecting said resistance means and said pick-up coil in series circuit relationship with one of said primary winding means, said stator also including a phase winding, means for energizing said phase winding, and means responsive to the voltage drop across said pick-up coil and said resistance means for controlling the energization of said phase winding, and means for selectively connecting said first and second primary winding means in either series or parallel current flow relationship, and said first and second primary winding means being substantially equal in value.

7. In an alternating current motor adapted to operate at multiple voltages, a stator comprising first and second primary winding means for establishing a field of flux, a pick-up coil arranged to link a portion of said flux, resistance means, means for connecting said resistance means and said pick-up coil in series circuit relationship with one of said primary winding means, said stator also including a phase winding, means for energizing said phase winding, and means responsive to the voltage drop across said pick-up coil and said resistance means for controlling the energization of said phase winding, and means for selectively connecting said first and second primary winding means in either series or parallel current flow relationship, said means for controlling the energization of said phase winding comprising a switch for disconnecting said phase winding.

8. In a multiple voltage induction motor having a stator and a rotor, a first primary winding, a second primary winding, a phase winding, circuit means for selectively supplying electrical energy to said primary winding in either series or parallel, said circuit means including a pick-up coil arranged to link a portion of the stator flux and resistance means, and means including a switch for controlling the energization of said phase winding in response to a predetermined voltage change across said pick-up coil and resistance means.

9. In an induction motor, a first primary winding, a second primary winding, a phase winding, circuit means for selectively connecting said first and second primary windings in series or parallel circuit relationship, resistance means for causing a voltage drop in phase with the current flowing through at least one of said windings, a pick-up coil located to link a portion of the flux set up by said windings for generating a voltage that is influenced by the phase displacement of the currents flowing through the windings of the motor and the speed of the motor, and switching means energized by a voltage that is the resultant of voltage drop in phase with said current and said generated voltage.

10. In an induction motor, a first primary winding, a second primary winding, a phase winding, circuit means for selectively connecting said first and second primary windings in series or parallel circuit relationship, resistance means for causing a voltage drop in phase with the current flowing through at least one of said windings, a pick-up coil located to link a portion of the flux set up by said windings for generating a voltage that is influenced by the phase displacement of the currents flowing through the windings of the motor and the speed of the motor, and switching means energized by a voltage that is the resultant of voltage drop in phase with said current and said generated voltage, and means for connecting a portion of said resistance means in series with said phase winding.

SAMUEL NOODLEMAN.

REFERENCES CITED

The following references are of record in the file of this patent:

UNITED STATES PATENTS

| Number | Name | Date |
| --- | --- | --- |
| 1,315,965 | Jennings | Sept. 16, 1919 |
| 1,991,035 | Werner | Feb. 12, 1935 |
| 1,991,038 | Werner | Feb. 12, 1935 |
| 2,319,490 | Clark | May 18, 1943 |
| 2,442,207 | Noodleman | May 25, 1948 |